Nov. 23, 1937.          J. A. BYERS          2,099,722
PIPE JOINT
Filed Jan. 2, 1936
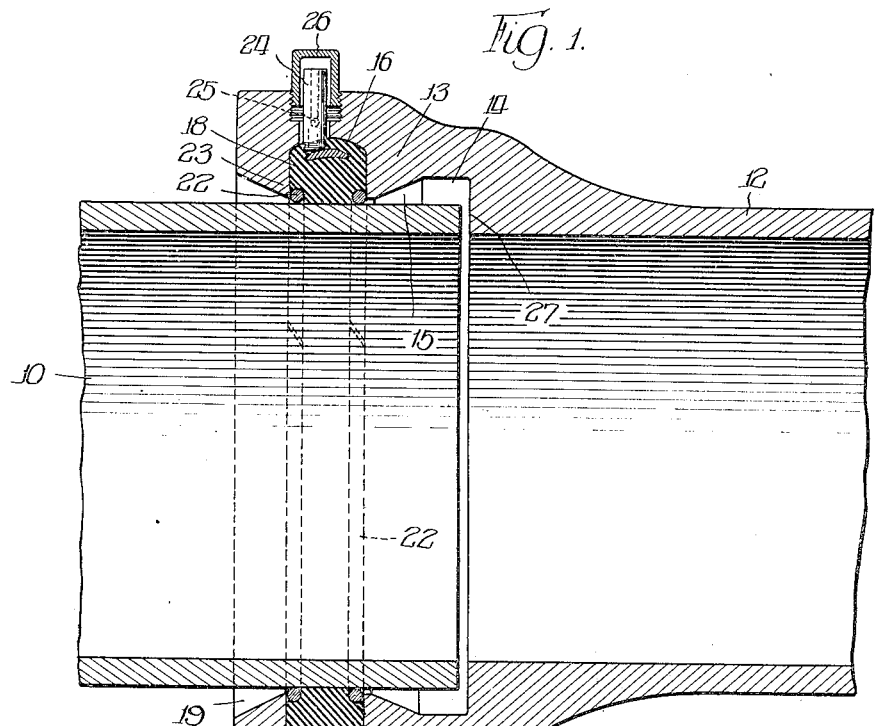
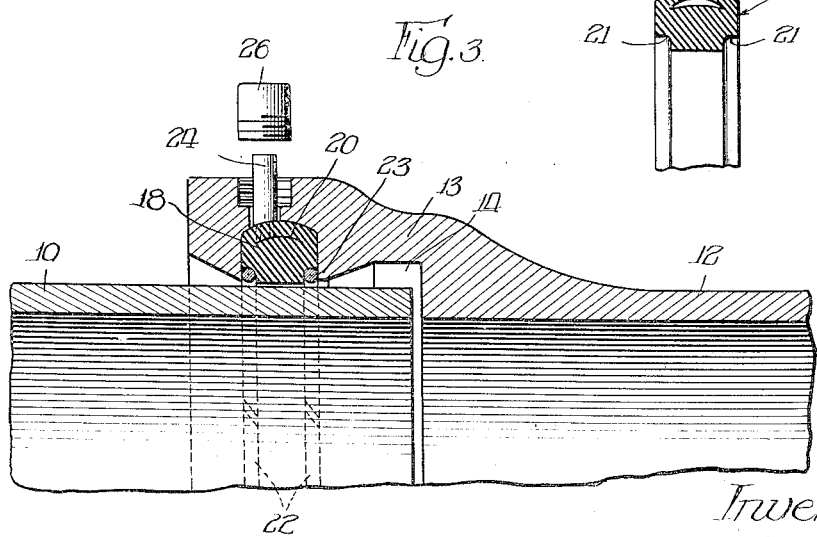
Inventor:
John A. Byers, Patented Nov. 23, 1937

2,099,722

UNITED STATES PATENT OFFICE 2,099,722

PIPE JOINT

John A. Byers, Evanston, Ill., assignor to James B. Clow & Sons, Chicago, Ill., a corporation of Illinois Application January 2, 1936, Serial No. 57,140

3 Claims. (Cl. 285—163)

The invention relates to mechanical joints for iron pipe and the like and has for an object to provide an improved joint of simple construction and which will be fluidtight although permitting considerable deflection and also contraction and expansion due to temperature changes.

The present form of mechanical joint is particularly useful in connection with cast or other pipe and especially when said pipe is employed for conducting gas, water, air or steam. In other rubber packed mechanical joints in use at the present time the pressure to seal the joint is produced by bolting a follower ring or gland to the bell of the pipe which in effect comprises a stuffing box. The mechanical joint of the invention utilizes a rubber gasket but the bolting of a follower or gland is eliminated, the necessary pressure to provide a tight and secure joint being produced by expansion of the gasket from within.

Accordingly, an object of the invention is to provide a pipe joint including an annular gasket of elastic material such as rubber which will be caused to expand by reason of pressure induced from within the gasket to thereby seal the joint.

A further object is to provide a pipe joint including an annular rubber gasket having an internal cavity adapted to be filled with a solidifiable fluid to produce an internal pressure and thus result in sealing of the joint.

With these and other objects in view the invention may consist of certain novel features of construction and operation, as will be more fully described and particularly pointed out in the specification, drawing and claims appended hereto.

In the drawing which illustrates an embodiment of the invention and wherein like reference characters are used to designate like parts—

Figure 1 is a longitudinal sectional view through a pipe joint constructed in accordance with the invention;

Figure 2 is a fragmentary sectional view of the rubber gasket showing the same provided with an internal cavity; and Figure 3 is a fragmentary longitudinal sectional view showing the joint of the invention prior to expansion of the gasket.

Referring to the drawing, particularly Figure 1, the pipe joint selected for illustrating the invention comprises the spigot end 10 and the bell end 12 of adjoining sections of iron pipe constituting a joint, the spigot end being of ordinary construction in that the exterior of the pipe is cylindrical and entirely free of protuberances or recesses. The bell end, however, is of special construction for the purpose of the present invention and consists of a bell or socket portion 13 which is formed with an internal annular cavity 14 somewhat larger in diameter than the exterior of the spigot end 10. This permits limited movement of said end as it is desirable for joints of this kind to have a certain amount of flexibility due to the fact that the pipe is not always laid in an exact straight line. The internal cavity 14 is joined by an angular wall 15 to the annular recess 16 which is adapted to receive the gasket 18, of elastic material, such as rubber or the like. On the opposite side of the recess the bell end 13 is provided with a second angular wall 19 and therefore the recess 16 has the angular walls 15 and 19 on the respective sides of the same.

The annular gasket, as shown in Figure 2, has a shape to conform with that of the recess but said gasket is somewhat larger in height than the depth of the recess 16 in order that the cavity 20 therein will be closed as shown in Figure 3 to exhaust all the air from said cavity. Said gasket is also provided with grooves 21 of substantially quadrantal shape on the respective sides thereof for receiving the split rings 22 of any suitable metal. Said rings are of the self-expanding type and serve to retain the gasket within its groove. The rings under all conditions assume a position within the recess 16 and thus have engagement with the side walls 23. Since rubber under pressure has a tendency to flow, the rings by preventing the rubber of the gasket from flowing or extruding through the necessary clearance between the bell member and the spigot member thereby direct the interior wall of the gasket inwardly toward the spigot end 10. With the gasket 18 inserted within its recess 16, as shown in Figure 3, and the split rings 22 in place, the internal diameter of said gasket is sufficiently large to provide just the proper clearance for the spigot end 10, permitting convenient assembly of the sections of pipe making up the joint.

When the gasket and split rings have been assembled as described expansion of said gasket is accomplished according to the invention by pressure introduced from within the gasket, thereby sealing the joint. For this purpose a valve stem 24 is provided which is sealed to said gasket until the bore of the stem is in communication with the cavity 20. The valve stem is fitted with a ball valve 25 of conventional construction to permit the flow of fluid inwardly so as to fill the cavity but which will prevent the fluid from flowing in an opposite direction outwardly of the cavity. By reason of the valve, therefore, it is possible to build up a considerable pressure within the gasket. Said valve stem is covered by a cap 26 suitably threaded within the bore formed in the bell end 13. The annular rubber gasket 18 is inflated by injecting into the cavity 20 thereof, through the valve stem 24 and under pressure, a solidifiable fluid such as felted paraffine, wax, lead or sulphur compounds. The fluid is forced through the valve stem until a pressure is built up within the cavity and which pressure is maintained by reason of the ball valve 25, preventing escape of the fluid while the same solidifies. Before the material forced into the cavity has completely hardened the cap 26 is filled with similar material and is then screwed in place, thus filling the cavity around the valve stem and exerting a little further pressure on the material within the rubber gasket. As a result of the pressure induced from within the gasket, said gasket being of elastic material, expands and in doing so compresses the split rings 22 which together with the gasket close on the spigot end 10 to effectively seal the joint between said spigot end and the bell end 13 of the joining pipe sections of the joint. The means for forcing the melted paraffine, wax or other fluid into the cavity of the gasket does not form any part of the invention and is therefore not shown. Any conventional form of pump will be suitable for this purpose but it is preferred to use an Alemite gun such as is now used for greasing automobiles.

The present pipe joint can be readily assembled in that sufficient clearance exists after assembly of the rubber gasket within its recess to permit easy insertion of the spigot end 10. Clearance also exists between said spigot end 10 and the shoulder 27 of the bell end 13 in order to permit a deflection of the pipe sections from a straight line. The present joint has a high degree of flexibility and thus considerable deflection is possible. The construction also allows contraction and expansion of the pipe sections and which may be a maximum for joints of this character without adversely affecting the efficiency of said joint. Also the present joint has a long life as the split rings effectively prevent a loss of the inflation pressure. Although rubber is incompressible it will extrude depending on pressure, size of opening and tensile strength of the rubber. The split rings serve the primary purpose of flexibility closing the necessary clearances between surfaces 15 and 19 and the spigot end 10 through which spaces the rubber of the gasket would eventually extrude, thereby relieving the sealing pressure of the gasket and allowing a leak to develop.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. A pipe joint comprising a bell member, a spigot member for entrance into said bell member, said bell member having an annular recess formed in the interior wall thereof, a gasket of elastic material adapted to fit within said recess and having encircling association with said spigot member, said gasket having a cavity therein, a valve stem fixed to the gasket and communicating with the cavity, said valve stem providing for the injection of a solidifiable liquid into the cavity to inflate the gasket whereby said gasket is forced into contact with the spigot member to form a tight joint, and tapering surfaces provided by the interior wall of the bell member on opposite sides of the recess to increase the clearance space between the bell and spigot members.

2. A pipe joint structure comprising a bell member having an annular recess formed in the interior wall thereof, an exteriorly cylindrical spigot member adapted to fit within said bell member, an elastic gasket within said recess in encircling association with the spigot member, split rings for holding said gasket in place in said recess, said gasket being expansible and in deflated condition permitting convenient entrance of the spigot member within the bell member, said gasket in inflated condition being forced into contact with said spigot member to form a tight seal.

3. A pipe joint structure comprising a bell member having an annular recess formed in the interior wall thereof, an exteriorly cylindrical spigot member adapted to fit within said bell member, an elastic gasket within said recess in encircling association with the spigot member, split rings for holding said gasket in place within the recess, a valve stem fitted to said gasket and having communication with the cavity for admitting a solidifiable liquid to said gasket, a valve in said stem permitting injection of said liquid into the cavity but preventing said liquid from escaping, whereby a pressure is built up within said gasket to cause an expansion of the same into contact with the spigot member to form a tight seal.

JOHN A. BYERS.